Nov. 6, 1951 A. H. A. WYNN 2,574,365

TIME BASE CIRCUITS

Filed May 9, 1947 4 Sheets-Sheet 1

INVENTOR
ARTHUR H.A.WYNN
By Ralph B. Stewart
Attorney

TIME BASE CIRCUITS

INVENTOR
ARTHUR H.A. WYNN
By Ralph B. Stewart
Attorney

Nov. 6, 1951

A. H. A. WYNN

TIME BASE CIRCUITS 2,574,365

Filed May 9, 1947

4 Sheets-Sheet 3

INVENTOR
ARTHUR H.A. WYNN
By Ralph B. Stewart
Attorney

Nov. 6, 1951

A. H. A. WYNN 2,574,365

TIME BASE CIRCUITS

Filed May 9, 1947

4 Sheets-Sheet 4

INVENTOR
ARTHUR H.A. WYNN
By Ralph B. Stewart
Attorney

Patented Nov. 6, 1951 2,574,365

UNITED STATES PATENT OFFICE 2,574,365

TIME BASE CIRCUITS

Arthur Henry Ashford Wynn, London, England, assignor to A. C. Cossor Limited, a British company Application May 9, 1947, Serial No. 748,026
In Great Britain May 10, 1946

7 Claims. (Cl. 315—27)

This invention relates to time-base circuit or sawtooth generator arrangements for scanning in a cathode ray tube. Circuits embodying the invention may be advantageously used for scanning the cathode ray tube of a television receiver.

The invention is applicable particularly to cathode ray tubes employing magnetic deflection wherein it is necessary to produce in the scanning coils substantial currents of saw-tooth wave-form.

One of the objects of the invention is to provide a simple time-base circuit in which use is made of but one pentode thermionic valve and one diode valve.

Another object of the invention is to provide a so-called single valve time-base circuit in which linearity of the saw-tooth wave-form is obtained without any special pre-set adjustment.

Yet another object of the invention is to provide an improved means of synchronising a time-base used in a television receiver.

According to one feature of the invention a time-base circuit for scanning in a cathode ray tube has the flyback restoration of the charging capacitor of the time-base initiated by a pulse derived from the anode circuit of the scanning valve. By charging capacitor is meant that capacitor in the time-base which experiences a slow uniform variation of charge during the stroke portion of the cycle, and which is quickly restored to its original state of charge during flyback. By the scanning valve is meant that a valve (with three or more electrodes) to the control grid of which is applied the voltage on the charging capacitor so as to control a current or voltage in the anode circuit.

According to another feature of the invention, in a time-base circuit for scanning in a cathode ray tube with magnetic deflection the flyback restoration of the charging capacitor of the said time-base is effected consequent upon receipt of a negative pulse derived from a potential divider across the deflector coils of the said cathode ray tube.

According to yet another feature of the invention the charging capacitor, in a time-base for frame scanning in a magnetically deflected cathode ray tube of a television receiver is arranged to be discharged by means operative upon receipt of a negative pulse derived from a winding on the driver transformer of the time-base.

Further features and modifications of the invention will become apparent in the following description which relates to the accompanying drawings, being circuit diagrams of a number of embodiments of the invention as follows.

Figure 1:
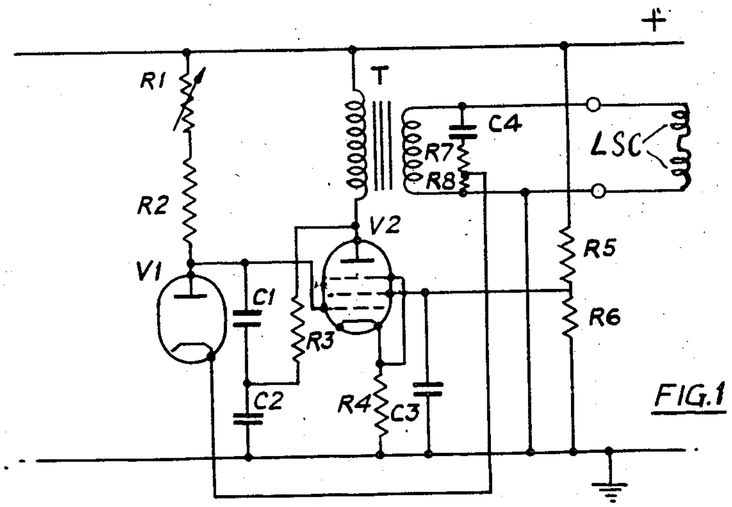
Figure 1 shows the invention used as the line scanning generator of a television receiver.

The circuit in Figure 1 is primarily intended for use as the line scanning generator of a television receiver. V1 is a small diode valve and V2 is a pentode or beam tetrode tube or valve. It is arranged that the diode V1 only conducts during the flyback of the time-base. V1 is caused to conduct during the flyback by a negative pulse applied to the cathode, which is obtained, in the preferred form of the invention, from a network C4, R7, R8 connected across the secondary of the line scanning transformer T. The negative pulse is generated in the secondary winding of transformer T due to the sudden decrease in current in the primary winding during the flyback time of the saw-tooth pulse. This negative pulse may, however, also be itself the synchronising pulse in which case the time-base belongs to the class of driven time-bases and is not self-running. Alternatively, the negative pulse may be obtained from a special small winding on the scanning transformer T.

The network C4, R7, R8, being arranged in shunt across the deflector coils of the cathode ray tube, constitutes a dissipation circuit in which the magnetic energy accumulated in the deflector coils during the current build-up of the stroke is dissipated rapidly during flyback by the discharge of capacitor C4 over resistors R7, R8. In relation to the negative pulse to be taken back to control flyback as above described, the network C4, R7, R8, or at least the resistors R7, R8, constitute a potential divider so as to reduce the amplitude of the pulse to approximately the correct level which is necessary for efficient operation.

The negative pulse, which causes the diode to conduct, charges the charging capacitor C1 negatively with respect to ground. During the time-base stroke the diode valve V1 is non-conducting and the condenser C1 is charged up over the feed path consisting of resistors R1 and R2. R1 is a variable resistance which controls the rate of charge and may be described as the line-hold or synchronisation control.

Negative feedback is applied to the circuit in known manner by resistor R3, connected at one end to the anode of V2 and at the other to the junction point of charging capacitor C1 and capacitor C2, charging capacitor C1 and capacitor C2 being in series between the control grid of V2 and earth. It may be shown mathematically that it is necessary for the time constant C2R3 to be approximately equal to the inductive time constant offered by the transformer primary if the trace is to be substantially linearised. It may also be shown that the flyback time is a minimum if R3 is adjusted so that the primary circuit of the scanning transformer T is critically damped.

The amplitude of the saw-tooth current in the scanning coils LSC connected across the secondary of transformer T may be controlled by varying either R7 or R8 or R6 or R5 or R4. The circuit must, however, be adjusted so that at no setting of the amplitude does the saw-tooth voltage applied to the control grid of V2 exceed the useable length of the grid-base of the valve V2. It will then be found that for reasonable variations in the amplitude of the saw-tooth there will be no loss in linearity or increase in flyback time.

Figure 3:
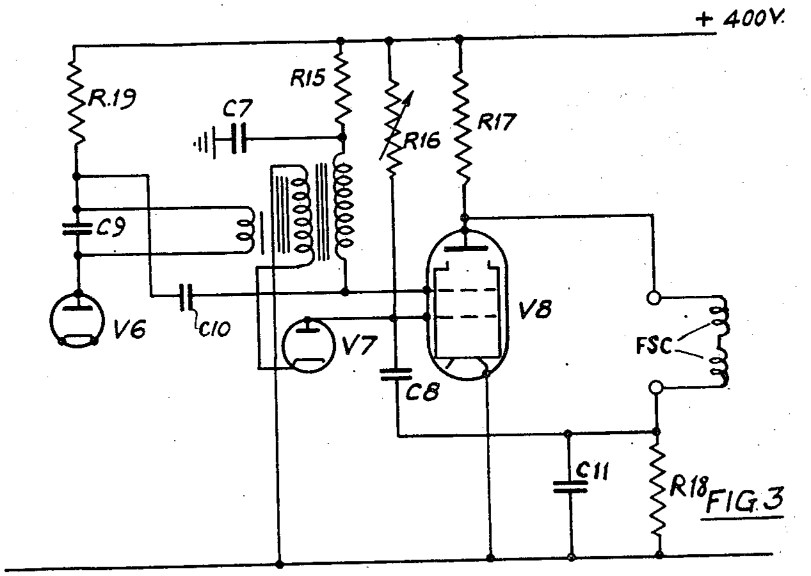
Figure 3 shows the invention used as the frame scanning circuit of a television receiver.
Figure 2:
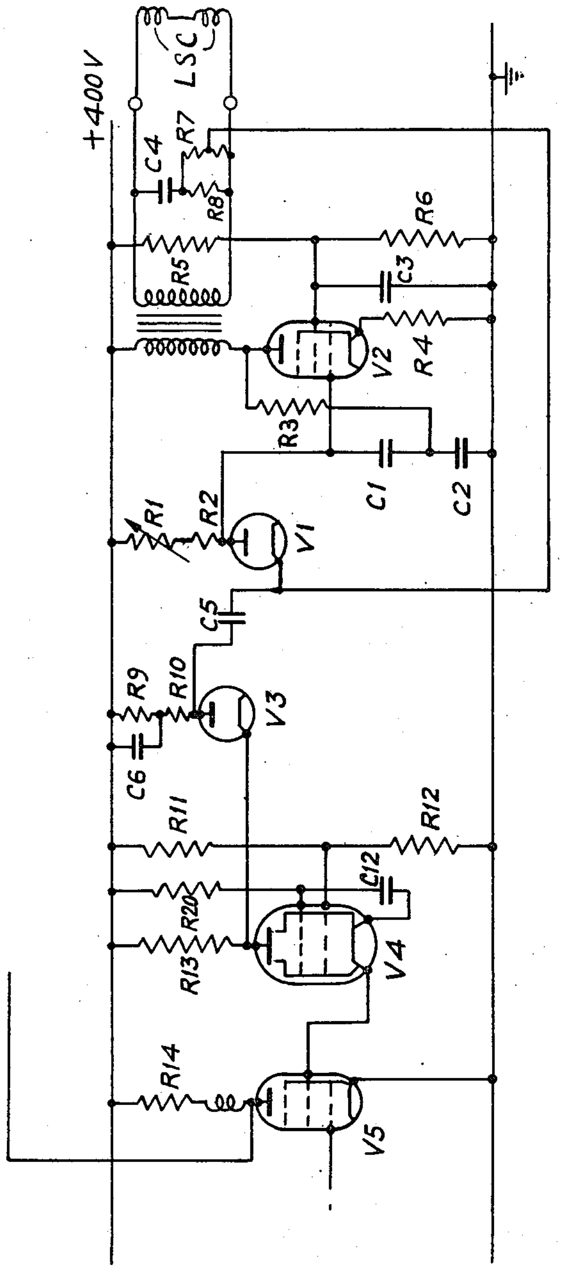
Figure 2 shows the invention incorporated as part of the complete line scanning circuits of a television receiver.

As the circuit in Figure 1 is regenerative a synchronising impulse or train of impulses may be applied to any active point. In the preferred circuit the synchronising pulses are applied to the cathode of diode V1. Suitable values for the components referred to in Figure 1 would be as follows:

T, ratio 8:1
R1, 100,000 ohms
R2, 180,000 ohms
R3, 100,000 ohms
R4, 100 ohms
R5, 22,000 ohms
R6, 56,000 ohms
R7, 500 ohms
R8, 1,000 ohms
C1, .001 microfarads
C2, .001 microfarads
C3, .1 microfarads
C4, .01 microfarads
V1, VR 92
V2, Cossor 61 BT The circuit of Figure 2 shows the time-base circuit incorporated in the complete line scanning circuit of a television receiver. The rectified television signal is applied to the control grid of amplifier tube V5. In order that V5 shall be a satisfactory amplifier for the lowest possible frequencies the screen potential is held stationary by the valve V4. The complete vision signal appears on the anodes of both V4 and V5. The signal on the anode of V5 is used to modulate the cathode ray tube and that on the anode of V4 to provide the line synchronising signal. Suitable values for the components additional to those required for the time-base circuit in Figure 1 would be as follows:

R9, 470,000 ohms
R10, 10,000 ohms
R11, 330,000 ohms
R12, 82,000 ohms
R13, 8,200 ohms
R14, 1,500 ohms
R20, 22,000 ohms
C12, .5 microfarads
C5, .001 microfarads
C6, .5 microfarads
V3, VR 92
V4, 6U6C
V5, Cossor 61 SPT The circuit shown in Figure 3 illustrates another application of the invention. The circuit in this case is that of the frame scanning circuit of a television receiver, V8 being the frame scanning valve or tube. In this case it is inexpedient to supply the negative pulse required by the time-base circuit from the anode circuit of the scanning valve, for due to inevitable mutual inductance between line and frame scanning coils it is found that pulses from the line scanning circuits interfere with the correct synchronisation of the frame scanning generator. It is therefore convenient to use a separate transformer in the screen grid circuit of V8 to provide the driving pulse for the time-base. The negative pulse is applied to V7 which charges condenser C8 negatively with respect to ground. During the stroke this condenser is charged positively through R16, the diode V7 being non-conducting, until grid current commences in V8, when the stroke comes to an end and the flyback commences. R16 may be made variable and may be used as the synchronisation or frame hold control.

Negative feedback is applied to the generator over resistor R18 which is in series with the frame scanning coils. If R18 is made variable this control may be used as the amplitude or picture height control. C11 reduces any stray line time-base pulses which reach the feedback circuit from the frame coils.

Figure 3 also illustrates the method of synchronisation of this frame scanning circuit. V6 is a sync-separation diode performing a similar function, and connected in a similar way to a signal source, as the diode V3 of Figure 2, only in this case the pulses are integrated by the condenser C9 and are fed to the scanning circuit by a separate synchronisation winding on the transformer. Simultaneously an unintegrated inhibiter pulse is fed via the condenser C10 to the screen grid of the line scanning valve. Suitable values for components referred to in Figure 3 would be as follows:

R15, 10,000 ohms
R16, 500,000 ohms
R17, 5,000 ohms
R18, 2,000 ohms
R19, 10,000 ohms
C7, .16 microfarads
C8, .05 microfarads
C9, .05 microfarads
C10, .001 microfarads
C11, .05 microfarads Figures 2 and 3 show two preferred forms of the invention. It is apparent however that this type of time-base generator employing (*a*) one pentode or beam tetrode valve or even a triode as scanning valve and (*b*) a diode which is only conducting during the flyback, may be used at any repetition frequency which may be required, and may be put to any purpose requiring the use of magnetic scanning of a cathode ray tube or to any other purpose where a current of saw-tooth wave-form is required.

Figure 4:
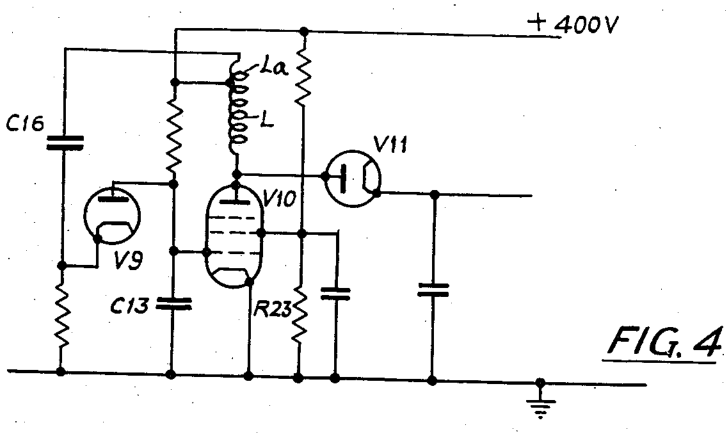
Figure 4 shows a modification of the invention.

The circuit of Figure 4 shows a slightly modified form of the invention in which it is used as the generator of a high voltage suitable for the anode supply of a cathode ray tube.

V10 has an inductance L in the anode which may be either air-cored or iron-cored. High voltage pulses are generated on the anode of V10 on the flyback and may be rectified by the high-voltage rectifier V11. The negative pulse for driving the circuit and charging C13 is provided by a small overwind *La* on the anode inductance. C16 is a direct current blocking condenser. By a correct choice of operating frequency and anode inductance very high efficiency is possible for voltages as high as 10,000 for the valve V10 specified in Figure 4.

This method of generating high voltage for the anode supply of a cathode ray tube may be combined with the magnetic time-bases already described in obvious ways.

Figure 5:
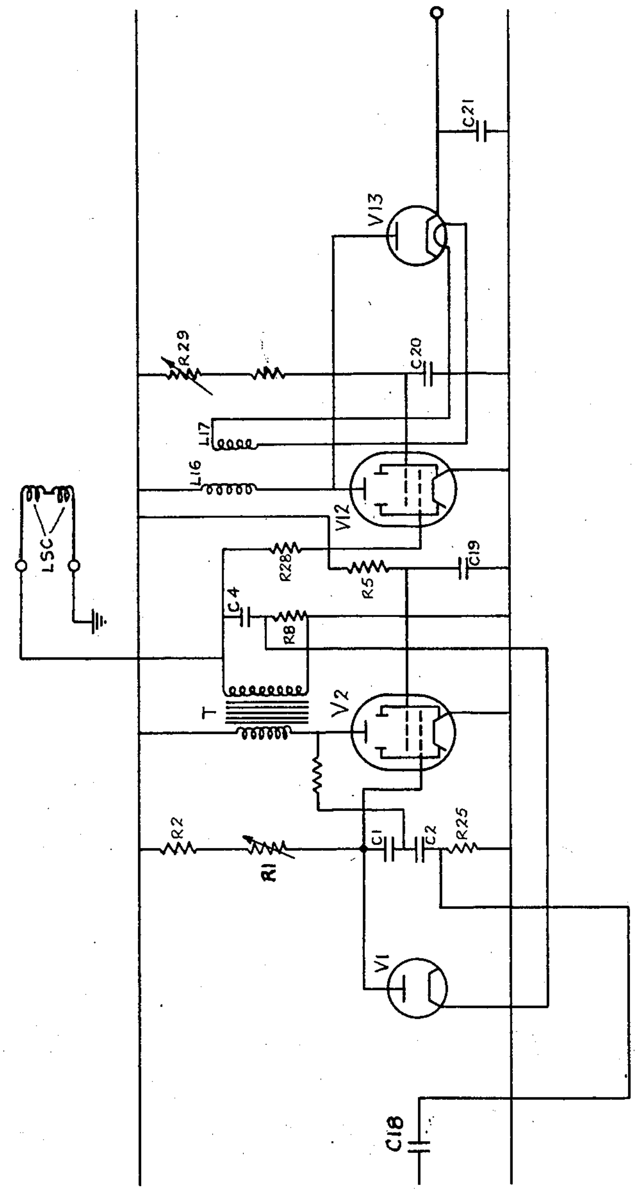
Figure 5 shows the invention incorporated as part of the line scanning and the extra high tension generator circuits of a television receiver.

In the circuit shown in Figure 5 the time-base circuit of Figure 1 is shown together with the extra high tension generator for the cathode ray tube. In this circuit the synchronising pulses are applied to a resistor R25 in series with the capacitors C1 and C2, and the time constant C18R25 is short so that the said synchronising pulses are differentiated. The drive for the control grid of the extra high tension generator valve, beam tetrode V12, is derived directly from the line deflector coils LSC over resistor R28. This resistor R28 prevents the line coils LSC from being too heavily loaded by the grid of valve V12. The voltage across the line coils LSC consists of negative pulses, the ideal wave-form for driving the said valve V12. This voltage is controllable by varying resistor R29 which in turn varies the potential on the screen of V12. The extra high tension rectifying diode V13 is heated at line frequency by means of a coupling coil L17 inserted inside the coil L16 forming the anode load of V12. The capacitor C21 is not necessary if the cathode ray tube is metallised, as the capacitance between the metallised tube coating and the carbon coating on the inside is adequate for smoothing purposes. A carbon coating or any other conducting coating on the outside of the cathode ray tube will also give an adequate smoothing capacitance.

There is no other equally simple time-base known to the art which provides such excellent linearity of trace. While other single-valve time-bases are known they depend for their satisfactory operation either on some characteristic of a thermionic valve not normally the subject of close production control, or upon the critical adjustment of certain components. The time-base here described relies only on the normal characteristics of a thermionic valve, and due to the use of negative feedback and to the fundamental nature of the circuit provides a trace sufficiently linear for all normal purposes without any critical adjustment.

I claim:

1. A time-base circuit, comprising an electron discharge tube having an anode, a cathode, and at least two control electrodes, a first of said two control electrodes being nearest said cathode and the second being nearest said anode, a voltage source having a positive terminal and a negative terminal, means connecting said anode to said positive terminal, means connecting said cathode to said negative terminal, a time-base capacitor connected between said first control electrode and said cathode, a resistor connected between said first control electrode and said positive terminal, a transformer having a primary winding and a secondary winding, means connecting said primary winding between said second control electrode and said positive terminal, a rectifier device, and means connecting said rectifier device and said secondary winding in series between said first control electrode and said cathode.

2. A time-base circuit, comprising an electron discharge tube having an anode, a cathode, and at least two control electrodes, a first of said two control electrodes being nearest said cathode and the second being nearest said anode, a voltage source having a positive terminal and a negative terminal, means connecting said anode to said positive terminal, means connecting said cathode to said negative terminal, first and second output terminals, means connecting said first output terminal to said anode, a resistor connected between said second output terminal and said cathode, a time-base capacitor connected between said first control electrode and said second output terminal, a time-base resistor connected between said first control electrode and said positive terminal, a transformer having a primary winding and a secondary winding, means connecting said primary winding between said second control electrode and said positive terminal, a rectifier device, and means connecting said rectifier device and said secondary winding in series between said first control electrode and said cathode.

3. A time-base circuit according to claim 1 and including a third winding on said transformer, and a source of synchronizing pulses energizing said third winding.

4. Television apparatus including a frame time-base circuit comprising an electron discharge tube having an anode, a cathode, and at least two control electrodes, a transformer having a primary and a secondary winding, means connecting said primary winding in the circuit of one of said control electrodes, means connecting one end of said secondary winding to said cathode, a rectifier having one terminal connected to the other end of said secondary winding, means connecting another terminal of said rectifier to the other of said control electrodes, a source of voltage having a negative and a positive terminal, a resistor connecting said other of the control electrodes to said positive terminal, means connecting said negative terminal to said cathode, a time-base capacitor in shunt connection with said rectifier, and frame scanning coils connected in a circuit between the anode and cathode of said tube, the apparatus also including a line time-base circuit comprising a second electron discharge tube having an anode, a cathode and at least one control electrode, a second transformer having a primary winding and a secondary winding, means connecting said primary winding of the second transformer in the anode circuit of said second electron discharge tube, means connecting said secondary winding of said second transformer to the cathode of said second electron discharge tube, a second rectifier, means connecting one terminal of said second rectifier to said secondary winding of said second transformer, means connecting another terminal of said second rectifier to said control electrode of said second tube, a line time-base capacitor connected between the control grid and cathode of said second tube, a resistive circuit for charging said line time-base capacitor and line scanning coils having a stray coupling with said frame scanning coils and connected across the secondary winding of said second transformer.

5. Television apparatus as claimed in claim 4, wherein said frame time-base circuit comprises one output terminal connected to the anode of the first said electron discharge tube, a further resistive device having one terminal connected to the cathode of the first said tube, and a second output terminal connected to the other end of said further resistive device, the first said time-base capacitor being in shunt connection with the first said rectifier through the last said resistive device.

6. Television apparatus as claimed in claim 4, wherein said means for connecting one terminal of said second rectifier to the secondary winding of said second transformer, comprise a potential divider including resistance and capacitance connected across the last said secondary winding and a connection from an intermediate tap on said potential divider to said one terminal of the second rectifier.

7. Television apparatus as claimed in claim 4, and including an extra high tension unit comprising a rectifier connected to rectify the output voltage from said line time-base circuit.

ARTHUR HENRY ASHFORD WYNN.

REFERENCES CITED

The following references are of record in the file of this patent:

UNITED STATES PATENTS

| Number | Name | Date |
| --- | --- | --- |
| 2,077,574 | Maloff | Apr. 20, 1937 |
| 2,165,815 | Rhea | July 11, 1939 |
| 2,220,712 | Geiger | Nov. 5, 1940 |
| 2,250,686 | Urtel | July 29, 1941 |
| 2,265,620 | Bahring | Dec. 9, 1941 |
| 2,265,988 | Andrieu | Dec. 16, 1941 |
| 2,284,337 | Mulert et al. | May 26, 1942 |
| 2,300,524 | Roberts | Nov. 3, 1942 |
| 2,336,837 | Bedford | Dec. 14, 1943 |
| 2,414,546 | Nagel | Jan. 21, 1947 |